US010830147B2

(12) United States Patent
Snyder

(10) Patent No.: US 10,830,147 B2
(45) Date of Patent: Nov. 10, 2020

(54) HEAT EXCHANGER INTEGRATED WITH FUEL NOZZLE

(71) Applicant: Rolls-Royce North American Technologies, Inc., Indianapolis, IN (US)

(72) Inventor: Douglas J. Snyder, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 617 days.

(21) Appl. No.: 15/411,239

(22) Filed: Jan. 20, 2017

(65) Prior Publication Data

US 2017/0218845 A1    Aug. 3, 2017

Related U.S. Application Data

(60) Provisional application No. 62/288,114, filed on Jan. 28, 2016.

(51) Int. Cl.
| | | |
|---|---|---|
| *F02C 7/18* | (2006.01) | |
| *F23R 3/28* | (2006.01) | |
| *F02C 7/224* | (2006.01) | |

(52) U.S. Cl.
CPC ............ *F02C 7/185* (2013.01); *F02C 7/224* (2013.01); *F23R 3/28* (2013.01); *F23R 3/283* (2013.01); *F23R 3/286* (2013.01)

(58) Field of Classification Search
CPC .. F23R 3/283; F23R 3/045; F23R 3/12; F23R 3/28; F02C 7/224; F02C 7/185; F05D 2260/204; F05D 2230/11; F05D 2230/10; F05D 2250/283; F02M 31/20
See application file for complete search history.

(56) References Cited

U.S. PATENT DOCUMENTS

| | | | |
|---|---|---|---|
| 3,535,875 A | 10/1970 | Sneeden et al. | |
| 4,120,150 A | 10/1978 | Wakeman | |
| 4,229,944 A | 10/1980 | Weiler | |
| 5,351,477 A | 10/1994 | Joshi et al. | |
| 5,735,115 A * | 4/1998 | Maghon | F02K 3/10 60/804 |
| 6,076,356 A * | 6/2000 | Pelletier | F23D 11/107 60/740 |
| 6,763,663 B2 * | 7/2004 | Mansour | F23R 3/283 60/39.83 |

(Continued)

FOREIGN PATENT DOCUMENTS

| | | |
|---|---|---|
| CN | 104110309 A | 10/2014 |
| EP | 2644766 A2 | 11/2013 |

(Continued)

OTHER PUBLICATIONS

Extended European Search Report, European Application No. 17152879. 7-1605, dated Jul. 3, 2017, 10 pages.

(Continued)

*Primary Examiner* — Todd E Manahan
*Assistant Examiner* — Thuyhang N Nguyen
(74) *Attorney, Agent, or Firm* — Barnes & Thornburg LLP

(57) ABSTRACT

A cooling air system for use in a gas turbine engine includes a fuel-air heat exchanger. The fuel-air heat exchanger allows heat transfer between a flow of cooling air used to cool components of the engine and a flow of fuel used to drive the engine.

28 Claims, 11 Drawing Sheets

(56) References Cited

U.S. PATENT DOCUMENTS

| | | |
|---|---|---|
| 6,993,913 B2 | 2/2006 | Kobayashi et al. |
| 8,479,518 B1 | 7/2013 | Chen |
| 8,820,047 B2 | 9/2014 | Saito et al. |
| 9,932,940 B2* | 4/2018 | Lo .................... F02C 7/224 |
| 2004/0040306 A1 | 3/2004 | Prociw et al. |
| 2010/0071667 A1 | 3/2010 | Hicks et al. |
| 2011/0005232 A1 | 1/2011 | Williams et al. |
| 2011/0088405 A1* | 4/2011 | Turco .................... F01D 5/081 60/782 |
| 2011/0107769 A1 | 5/2011 | Stevenson et al. |
| 2011/0302928 A1 | 12/2011 | Mudawar |
| 2013/0219915 A1 | 8/2013 | Prociw et al. |
| 2014/0060057 A1 | 3/2014 | John et al. |
| 2014/0238036 A1 | 8/2014 | Uhm et al. |
| 2014/0327194 A1 | 11/2014 | Matusewicz et al. |
| 2015/0000291 A1 | 1/2015 | Smith et al. |
| 2016/0025009 A1 | 1/2016 | Morenko et al. |
| 2016/0138873 A1 | 5/2016 | Dyer |
| 2016/0290290 A1 | 10/2016 | Lo |

FOREIGN PATENT DOCUMENTS

| | | |
|---|---|---|
| EP | 2677240 A2 | 12/2013 |
| EP | 3075983 A1 | 10/2016 |
| EP | 3199871 A1 | 8/2017 |
| FR | 2817016 A1 | 5/2002 |
| GB | 2476253 A | 6/2011 |
| WO | 2015054136 A1 | 4/2015 |
| WO | 2015112215 A2 | 7/2015 |

OTHER PUBLICATIONS

Extended European Search Report, dated Sep. 18, 2018 and issued in connection with EP Appln. No. 18169171.8.

Extended European Search Report, dated Oct. 24, 2018 and issued in connection with EP Appln. No. 18170080.8.

* cited by examiner

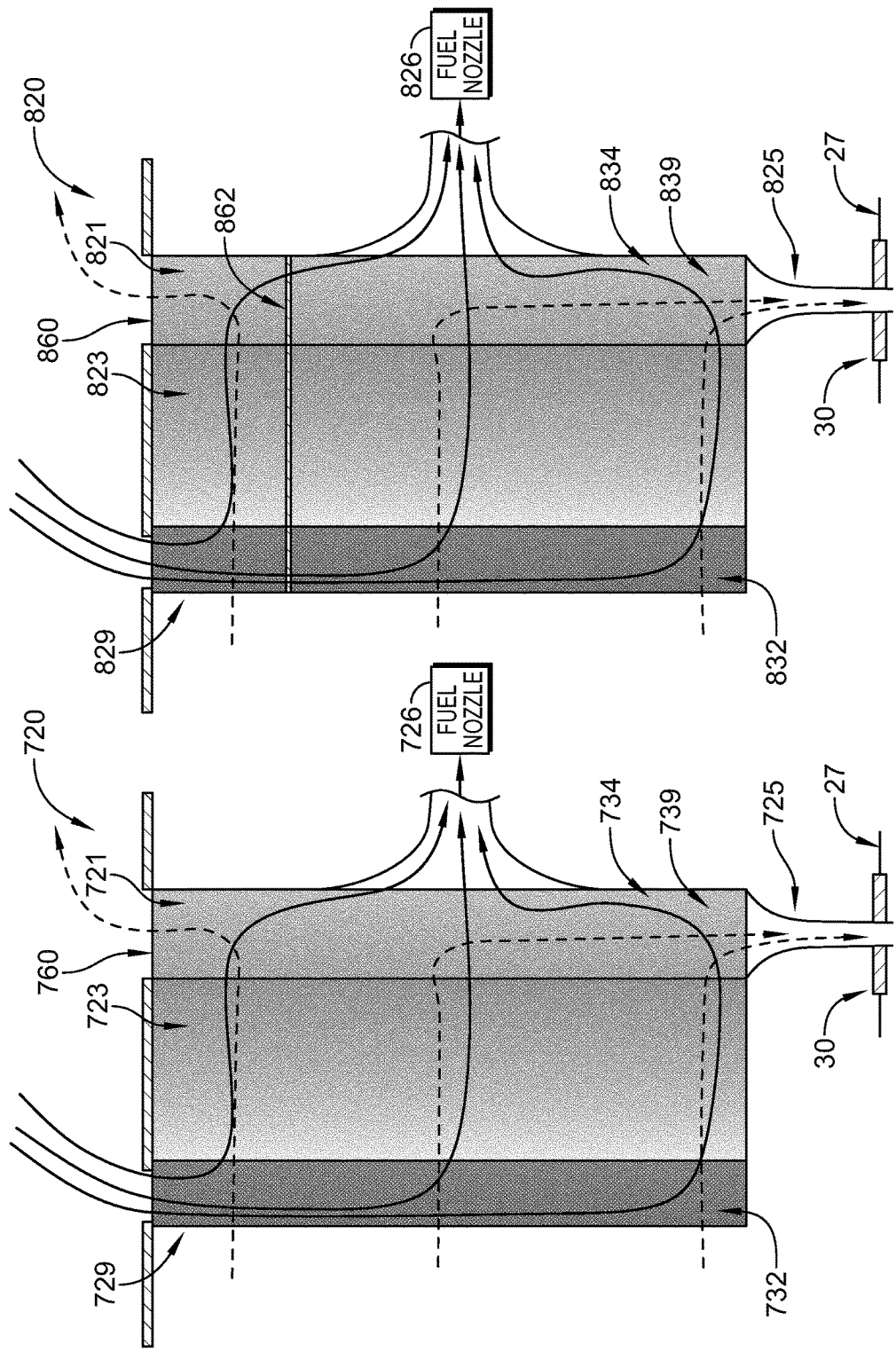

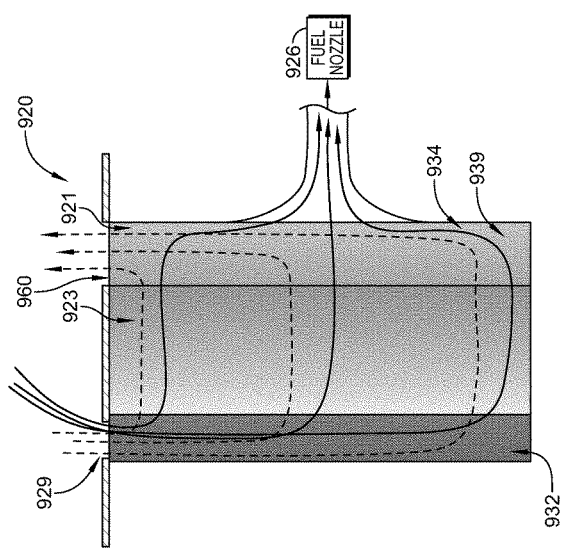

000# HEAT EXCHANGER INTEGRATED WITH FUEL NOZZLE

CROSS REFERENCE TO RELATED APPLICATIONS

This application claims priority to and the benefit of U.S. Provisional Patent Application No. 62/288,114, filed 28 Jan. 2016, the disclosure of which is now expressly incorporated herein by reference.

FIELD OF THE DISCLOSURE

The present disclosure relates generally to gas turbine engines, and more specifically to cooling air systems of a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft.

Components in the turbine may be exposed to high temperatures from products of the combustion reaction in the combustor. Cooling of these components presents design challenges.

SUMMARY

The present application discloses one or more of the features recited in the appended claims and/or the following features which, alone or in any combination, may comprise patentable subject matter.

According to the present disclosure, a fuel injector for a gas turbine engine may include a nozzle, a stem, and a fuel-air heat exchanger. The nozzle may be configured to discharge fuel into a combustion chamber included in the gas turbine engine. The stem may be coupled to the nozzle and may be configured to conduct fuel to the nozzle.

In illustrative embodiments, the fuel-air heat exchanger may be integral with the stem to provide cooled air at a discrete circumferential location when the fuel nozzle is used in the gas turbine engine. The fuel-air heat exchanger may include a fuel passageway coupled fluidly with the nozzle and a cooling air passageway located along the fuel passageway such that heat is transferred from air flowing through the cooling air passageway to the fuel flowing through the fuel passageway when the fuel nozzle is used in the gas turbine engine.

In illustrative embodiments, the fuel-air heat exchanger may include at least one of an insert arranged in the fuel passageway and an insert arranged in the cooling air passageway. In illustrative embodiments, the insert may be arranged in the fuel passageway may be corrugated and/or the insert arranged in the cooling air passageway may be corrugated.

In illustrative embodiments, the fuel-air heat exchanger may include a plurality of pins positioned in the cooling air passageway such that air moving through the cooling air passageway flows over the pins.

In illustrative embodiments, the fuel-air heat exchanger may include a plurality of plates that are etched and bonded together to form the fuel passageway and the cooling air passageway. In illustrative embodiments, the fuel-air heat exchanger may include a plurality of nested tubes having different diameters that cooperate to define the fuel passageway and the cooling air passageway. In illustrative embodiments, each of the nested tubes may have an oblong cross sectional shape.

In illustrative embodiments, the fuel-air heat exchanger may include a sheet formed to define at least one channel and a tube. The sheet may be helically wrapped around the tube to close the channel and define a helical flow path.

In illustrative embodiments, the fuel-air heat exchanger may include channels arranged between the fuel passageway and the cooling air passageway filled with a heat-exchange medium to form a heat pipe assembly between fuel in the fuel passage and air in the cooling air passage when the fuel injector is in use.

According to the present disclosure, a combustor assembly for use in a gas turbine engine may include a combustor case, a combustion liner mounted in the combustor case to define a combustion chamber, and a plurality of fuel injectors. The fuel injectors may be adapted to conduct fuel from a supply line arranged outside the combustor case into the combustor case. The fuel injectors may also be adapted to discharge fuel into the combustion chamber.

In illustrative embodiments, each fuel injector may include a nozzle, a stem, and a fuel-air heat exchanger. The nozzle may be configured to discharge fuel into the combustion chamber. The stem may be coupled to the nozzle and may be configured to conduct fuel to the nozzle.

In illustrative embodiments, the fuel-air heat exchanger may be integral with the stem to provide cooled air at a discrete circumferential location when the fuel nozzle is used in the gas turbine engine. The fuel-air heat exchanger may include a fuel passageway coupled fluidly with the nozzle and a cooling air passageway located along the fuel passageway such that heat is transferred from air flowing through the cooling air passageway to the fuel flowing through the fuel passageway when the fuel nozzle is used in the gas turbine engine.

In illustrative embodiments, each fuel injector may include a connector coupled to the combustor case. The stem may extend from the connector to the nozzle.

In illustrative embodiments, each fuel injector may be circumferentially spaced apart from the other fuel injectors.

In illustrative embodiments, an inlet of the cooling air passageway included in each fuel injector may be fluidly separate from inlets of the cooling air passageways include in the other fuel injectors.

In illustrative embodiments, the fuel-air heat exchanger may include at least one of a corrugated insert comprising metallic materials arranged in the fuel passageway and a corrugated insert comprising metallic materials arranged in the cooling air passageway.

In illustrative embodiments, the fuel-air heat exchanger may include a plurality of plates that are etched and bonded together to form the fuel passageway and the cooling air passageway.

In illustrative embodiments, the plurality of plates may be etched and bonded together to form channels arranged between the fuel passageway and the cooling air passageway filled with a heat-exchange medium to form a heat pipe assembly between fuel in the fuel passage and air in the cooling air passage when the fuel injector is in use.

In illustrative embodiments, the fuel-air heat exchanger may include a sheet formed to define at least one channel and a tube, wherein the sheet is helically wrapped around the tube to close the channel and define a helical flow path.

According to the present disclosure, a gas turbine engine may include a turbine assembly and a combustor. The turbine assembly may include a cooling air cavity and a cooled turbine blade. The combustor may include a combustor case, a combustion liner mounted in the combustor case to define a combustion chamber, and a plurality of fuel injectors adapted to conduct fuel from a supply line arranged outside the combustor case into the combustor case and to discharge fuel into the combustion chamber.

In illustrative embodiments, each fuel injector may include a nozzle, a stem, and a fuel-air heat exchanger. The nozzle may be configured to discharge fuel into the combustion chamber. The stem may be coupled to the nozzle and configured to conduct fuel to the nozzle. The fuel-air heat exchanger may be integral with the stem to provide cooled air to the cooling air cavity to provide cooling air to the cooled turbine blade. The fuel-air heat exchanger may include a fuel passageway coupled fluidly with the nozzle and a cooling air passageway located along the fuel passageway such that heat is transferred from air flowing through the cooling air passageway to the fuel flowing through the fuel passageway when the fuel nozzle is used in the gas turbine engine.

In illustrative embodiments, the cooling air passageway may be coupled for fluid communication with the cooling air cavity of the turbine assembly. In illustrative embodiments, the cooling air passageway may be configured to conduct cooling air to a location radially inward of the combustion liner included in the combustor. In illustrative embodiments, the cooling air passageway may be configured to conduct cooling air through an inner combustor case included in the combustor. The gas turbine engine may further include a seal member to block air from passing around the cooling air passageway and through the inner case.

In illustrative embodiments, the seal member may be formed to allow misalignment of the fuel injector with the inner case and still block the flow of air around the cooling air passageway.

According to the present disclosure, a method of replacing a fuel injector in a gas turbine engine may include removing one of a plurality of circumferentially spaced fuel injectors from the engine without removing the engine from an airframe to which the engine is attached.

In illustrative embodiments, each fuel injector may include a nozzle, a stem, and a fuel-air heat exchanger. The nozzle may be configured to discharge fuel into a combustion chamber included in the gas turbine engine. The stem may be coupled to the nozzle and may be configured to conduct fuel to the nozzle. The fuel-air heat exchanger may be integral with the stem to provide cooled air at a discrete circumferential location when the fuel nozzle is used in the gas turbine engine. The fuel-air heat exchanger may include a fuel passageway coupled fluidly with the nozzle and a cooling air passageway located along the fuel passageway such that heat is transferred from air flowing through the cooling air passageway to the fuel flowing through the fuel passageway when the fuel nozzle is used in the gas turbine engine.

These and other features of the present disclosure will become more apparent from the following description of the illustrative embodiments.

BRIEF DESCRIPTION OF THE DRAWINGS

FIG. 16 is a view similar to FIG. 14 showing another embodiment of an integral heat exchanger for use in a fuel injector and suggesting that the air and fuel products flow axially aft while heat is transferred from the air to the fuel products with some of the cooled air flowing inward through a funnel of the fuel injector and with some of the cooled air flowing outward through an aperture of the fuel injector;

FIG. 17 is a view similar to FIG. 16 showing another embodiment of an integral heat exchanger for use in a fuel injector and suggesting that the air and fuel products flow axially aft while heat is transferred from the air to the fuel products with portions of the cooled air separated by a divider wall such that some of the cooled air flows inward through a funnel of the fuel injector and some of the cooled air flows outward through an aperture of the fuel injector; and FIG. 18 is a view similar to FIG. 17 showing another embodiment of an integral heat exchanger for use in a fuel injector and suggesting that the air and fuel products flow axially aft while heat is transferred from the air to the fuel products with the cooled air flowing outward through an aperture of the fuel injector.

DETAILED DESCRIPTION

Figure 1:
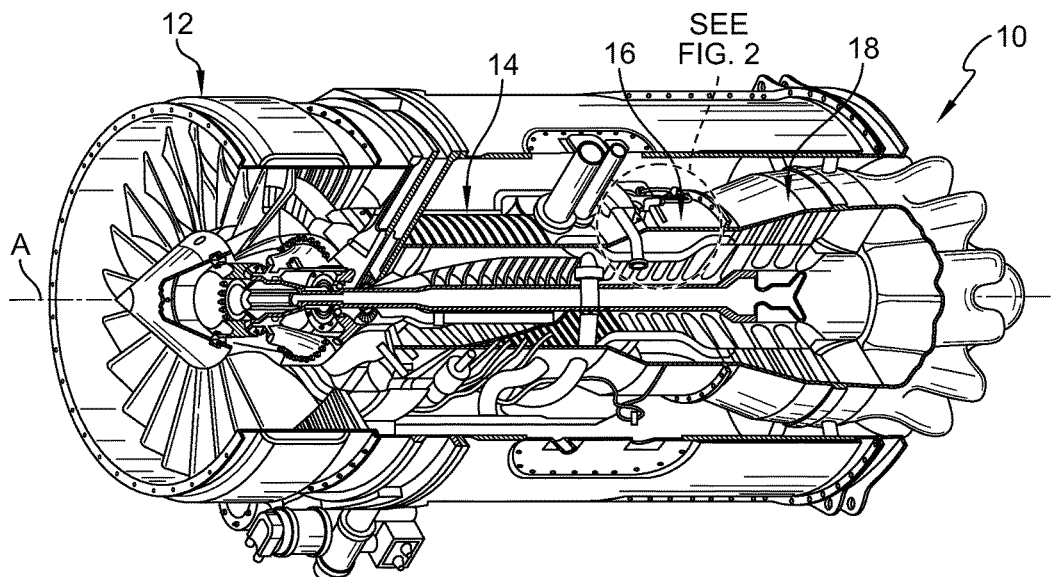
FIG. 1 is a cut-away perspective view of a gas turbine engine showing that the engine includes a fan, a compressor, a combustor, and a turbine, and further showing that the combustor includes a combustor liner defining a combustion chamber and a fuel injector for feeding fuel into the combustion chamber as shown in FIG. 2.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12. As used herein, directional references relate to the central axis A of the engine 10.

Figure 2:
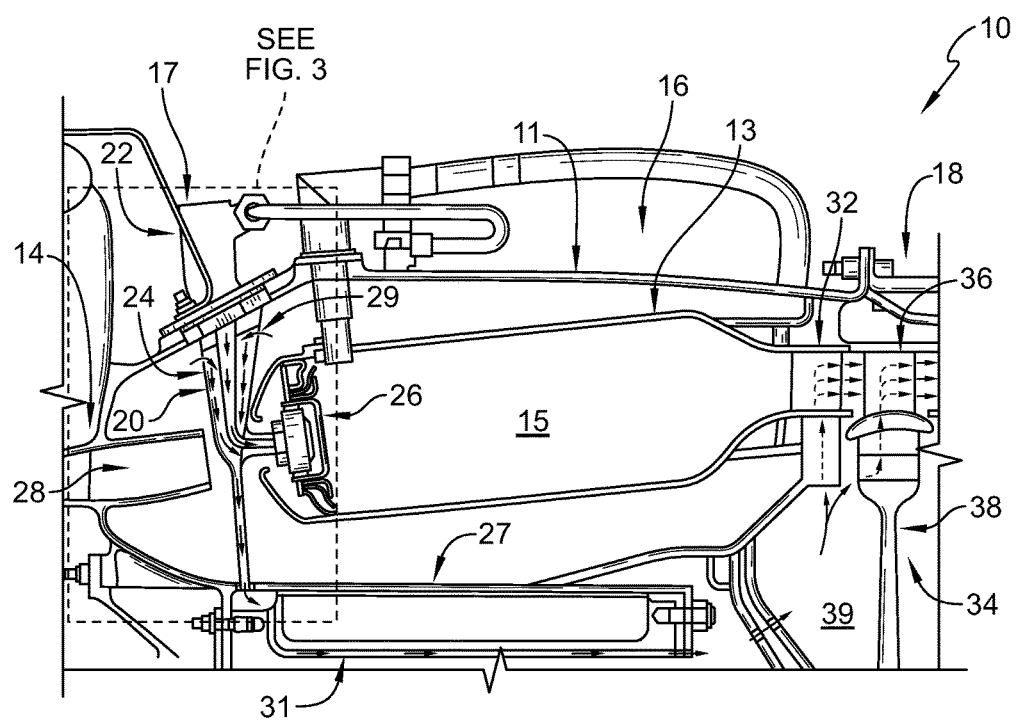
FIG. 2 is a partial sectional view of the gas turbine engine of FIG. 1 showing that a fuel injector is coupled to an outer combustor case aft of the compressor and forward of the combustor and suggesting that air from the compressor is directed through heat exchanger integrated into the fuel injector to transfer heat to fuel products also flowing through the heat exchanger to produce cooling air for use in cooling components of the turbine.

The combustor 16 includes an outer combustor case 11, a combustion liner 13 defining a combustion chamber 15, and a plurality of circumferentially spaced fuel injectors 17 as shown in FIG. 2. The combustor case 11 defines a high-pressure plenum for blocking escape of high-pressure products flowing within the combustor 16. The fuel injectors 17 are coupled to the combustor case 11 forward of the combustion chamber 15 and are configured to direct fuel products into the combustion chamber 15. In some embodiments, the combustion liner 13 is annular to define an annular combustion chamber 15. In some embodiments, the combustion liner 13 includes a plurality of combustion liners or cans defining a plurality of circumferentially spaced combustion chambers with one or more fuel injectors 17 associated with each combustion chamber.

Each fuel injector 17 includes a connector 22, a stem 24 extending radially inward from the connector 22, and a fuel nozzle 26 coupled to an inner end of the stem 24 as shown in FIG. 2. The connector 22 engages with the combustor case 11 to hold the fuel injector 17 in place and is configured to receive a flow of fuel product. The stem 24 and fuel nozzle 26 extend through the combustor case 11 to align the fuel nozzle 26 with the combustion chamber 15. In the illustrative embodiment, each of the fuel injectors 17 is separately replaceable from adjacent fuel injectors 17.

Figure 3:
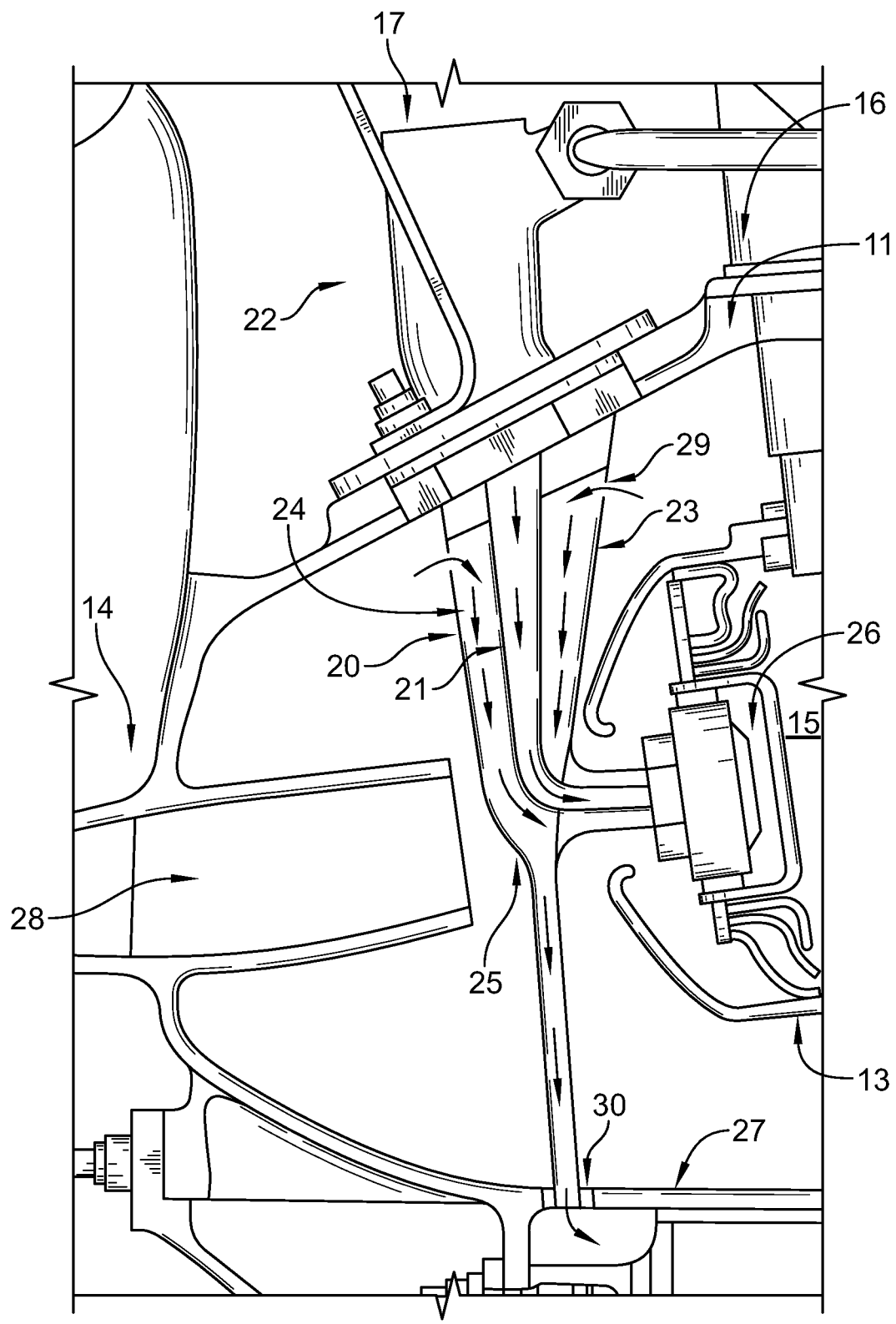
FIG. 3 is an enlarged view of FIG. 2 showing that a cooling air passageway and a separate fuel passageway are formed in a stem of the fuel injector to provide the heat exchanger integrated into the fuel injector and suggesting that fuel products flow through the fuel passageway to a fuel nozzle to direct the fuel products into the combustion chamber and that the air from the compressor is fluidly isolated form the fuel products as the air passes through the cooling air passageway.

The stem 24 is formed to include an integral fuel-air heat exchanger 20 as suggested in FIG. 3. Fuel products enter through the connector 22, flow through a fuel passageway 21 of the stem 24 toward the fuel nozzle 26, and exit the fuel nozzle 26 into the combustion chamber 15 to be mixed and ignited with air from the compressor 14. An outlet 28 directs the compressed air exiting the compressor 14 around the fuel nozzle 26 and into the combustion chamber 15. In the illustrative embodiment, one or more inlet ports 29 allow air in the high pressure plenum of the outer case 11 to flow into a cooling air passageway 23 of the stem 24 to transfer heat to the fuel products in the fuel passageway 21 and form cooling air for use in the turbine 18 or other areas of the engine 10.

The fuel passageway 21 and cooling air passageway 23 are fluidly isolated from one another while allowing heat transfer between the fuel products and compressed air flowing therein as suggested in FIG. 3. The cooling air collects in a funnel 25 and is directed through an inner case 27 of the combustor 16. The funnel 25 extends through the inner case 27 and seals against a seal element 30. In some embodiments, the seal element 30 is a brush seal.

The turbine 18 of the illustrated embodiment includes at least one turbine vane 32 and at least one turbine wheel assembly 34 as shown in FIG. 2. The turbine wheel assembly 34 includes a plurality of blades 36 coupled to a rotor disk 38 for rotation therewith. The hot, high pressure combustion products from the combustor 16 are directed through the vane 32 toward the blades 36 to cause the turbine wheel assembly 34 to rotate; thereby, driving the rotating components of the compressor 14 and/or the fan 12. The cooling air formed in the fuel-air heat exchanger 20 of the fuel injector 17 flows through the inner case 27 along a flow channel 31 to a cooling air cavity 39. The cooling air then flows through the vane 32 and turbine wheel assembly 34 to cool the components of the turbine 18. The cooling air can also be used to cool other portions of the turbine 18 and engine 10.

Figures 4, 5:
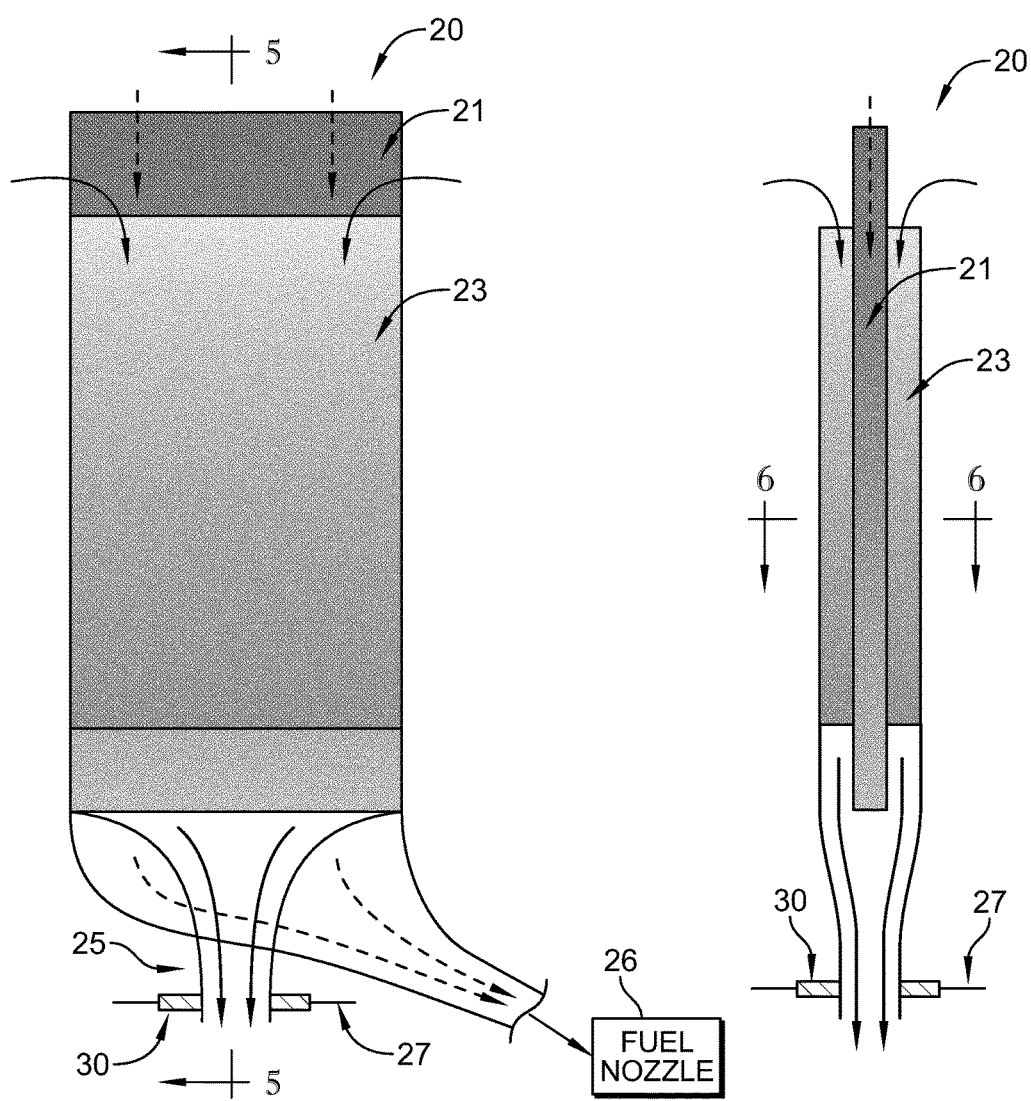
FIG. 4 is a diagrammatic side elevation of the stem of the fuel injector of FIG. 3 showing that hot air from the compressor enters the cooling air passageway of the heat exchanger and cold fuel products enter the fuel passageway of the heat exchanger through a radially outer end of the stem and suggesting that the air and fuel products flow radially inward while heat is transferred from the air to the fuel products.
FIG. 5 is a diagrammatic sectional view taken along line 5-5 in FIG. 4 showing that the cooling air passageway surrounds the fuel passageway and suggesting that contact of the air with an exterior of the fuel passageway allows heat to transfer from the air to the fuel products.

In the illustrative embodiment, fuel products and compressed air flow through the fuel-air heat exchanger 20 in a common, radially inward and parallel direction as suggested in FIGS. 3-5. In some embodiments, a counter-flow or cross-flow arrangement is used. Cold fuel products enter the fuel passageway 21 adjacent to hot air entering the cooling air passageway 23. Heat is transferred from the air to the fuel products as the air and fuel products flow through the fuel-air heat exchanger 20, as suggested by the gradient transition from light to dark of the air and from dark to light of the fuel products, where dark is cool and light is hot. The cooled air exits through the funnel 25 while the heated fuel products are directed toward the fuel nozzle 26.

Transferring heat to the fuel products allows less cooling air to be used, minimizing the work needed to create the cooling air which may provide a reduction in engine Specific Fuel Consumption (SFC). In the illustrative embodiment, the amount of heated fuel is limited to that flowing out of the fuel passageway 21 into the fuel nozzle 26, as suggested in FIGS. 4 and 5, and contained in the high-pressure plenum of the combustor case 11 as suggested in FIG. 2. The fuel-air heat exchanger 20 of the fuel injector 17 allows the heated fuel to be safely contained in the combustor case 11 while maximizing heat transfer with the cooling air.

Figure 6:
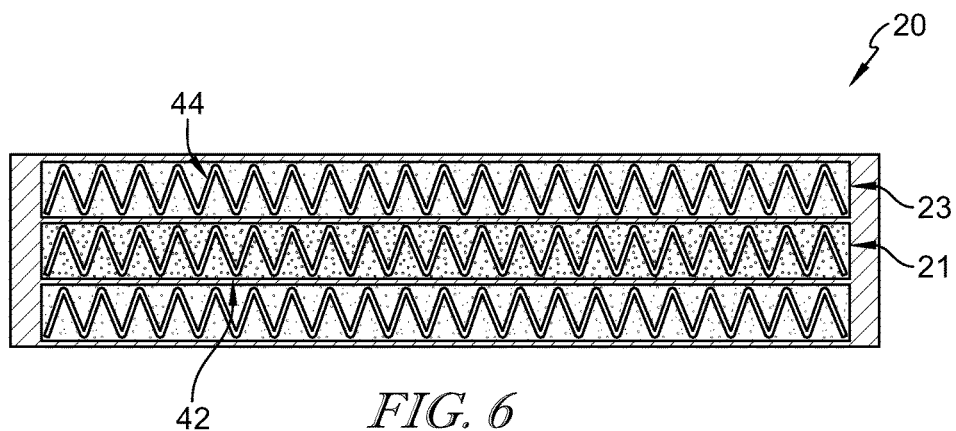
FIG. 6 is a diagrammatic sectional view taken along line 6-6 in FIG. 5 showing one embodiment of a fuel-air heat exchanger integrated into the stem of the fuel injector having corrugated inserts positioned in the fuel passageway and cooling air passageway to maximize heat transfer between the air and the fuel products.

In some embodiments, corrugated inserts 42, 44 are positioned in the fuel passageway 21 and cooling air passageway 23, respectively, as suggested in FIG. 6. The corrugated inserts 42, 44 may maximize the total heat transfer capacity of the fuel-air heat exchanger 20 while minimizing the wetted wall temperature in the fuel passageway 21. In some embodiments, the corrugated inserts 42, 44 are formed from successively folded sheets of metal.

Figure 7:
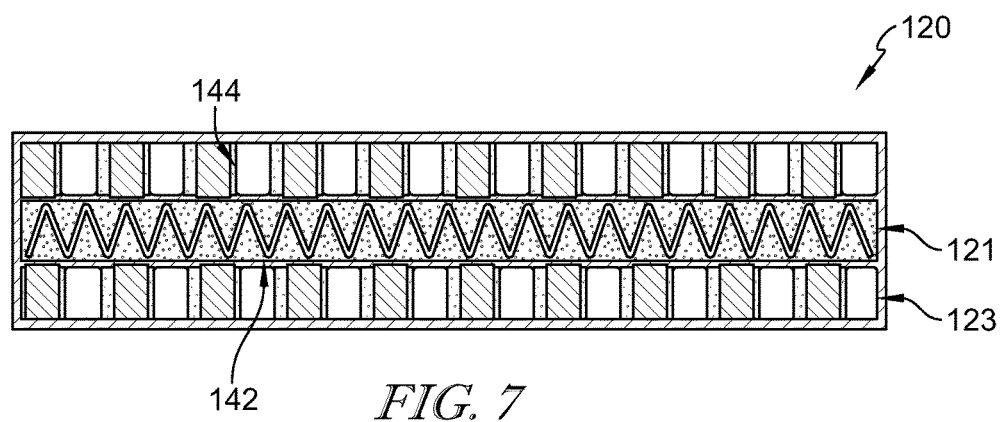
FIG. 7 is a view similar to FIG. 6 showing another embodiment of a fuel-air heat exchanger integrated into the stem of a fuel injector having a corrugated insert positioned in the fuel passageway and a plurality of circumferentially extending pins positioned in the cooling air passageway and spaced apart from one another to maximize heat transfer between the air and the fuel products.

Another embodiment of a fuel-air heat exchanger 120 for use in the fuel injector 17 is shown in FIG. 7. In the illustrative embodiment, the fuel-air heat exchanger 120 includes a fuel passageway 121 and a cooling air passageway 123. A corrugated insert 142 is positioned in the fuel passageway 121. A plurality of circumferentially extending pins 144 are positioned in the cooling air passageway 123. The pins 144 may be axially and/or radially spaced from one another to allow the air in the cooling air passageway 123 to flow around the pins 144. In some embodiments, the pins 144 are coupled to an exterior of the fuel passageway to form a heat exchanger core, and a housing slides over the heat exchanger core to define the cooling air passageways 123. The corrugated insert 142 and pins 144 may maximize the total heat transfer capacity of the fuel-air heat exchanger 120 while minimizing the wetted wall temperature in the fuel passageway 121. The passageways 121, 123, corrugated insert 142, and pins 144 can assume other orientations relative to one another and to the axis A of the engine 10, such as axial, radial, and circumferential as non-limiting examples.

Figure 8:
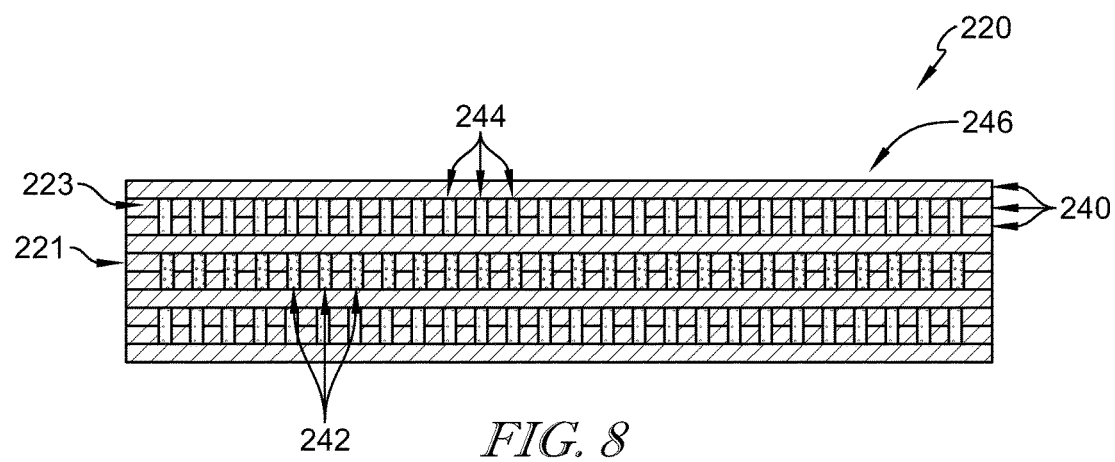
FIG. 8 is a view similar to FIG. 6 showing another embodiment of a fuel-air heat exchanger where the stem of a fuel injector is formed from a plurality of plates which are etched and bonded together to define radially extending channels of the fuel passageway and the cooling air passageway such that the heat exchanger is integral to the fuel injector.

Another embodiment of a fuel-air heat exchanger 220 for use in the fuel injector 17 is shown in FIG. 8. In the illustrative embodiment, the fuel-air heat exchanger 220 includes a plurality of plates 240 which are etched and bonded (or fused) together to define radially extending channels 242, 244. The channels 242 cooperate to define a fuel passageway 221. The channels 244 cooperate to define a cooling air passageway 223. The channels 242, 244 may maximize the total heat transfer capacity of the fuel-air heat exchanger 220 while minimizing the wetted wall temperature in the fuel passageway 221. In some embodiments, the plates 240 are formed from metallic materials and are diffusion bonded together to form a single printed-circuit block 246.

Figure 9:
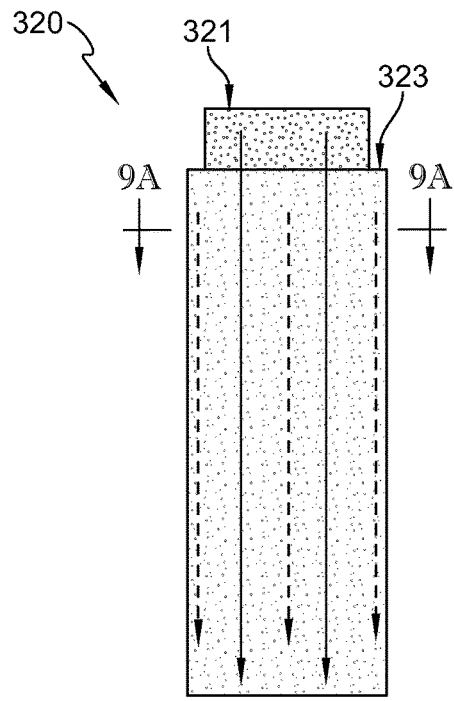
FIG. 9 is a view similar to FIG. 4 showing another embodiment of a fuel-air heat exchanger of the stem and a flow arrangement through the stem where the air and fuel products flow radially through respective cooling air and fuel passageways.
Figure 9A:
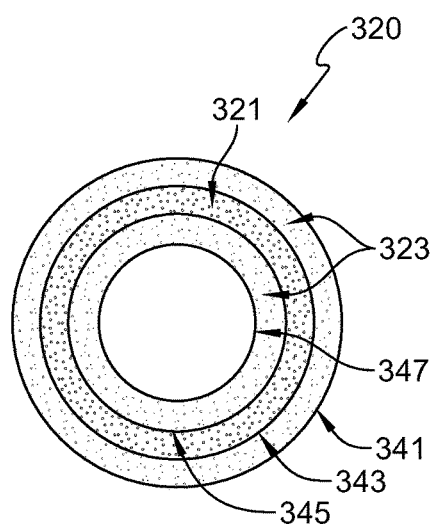
FIG. 9A is a diagrammatic sectional view taken along line 9A-9A in FIG. 9 suggesting that the stem is formed from a plurality of nested tubes having differing diameters to define an annular fuel passageway and annular cooling air passageways such that the heat exchanger is integral to the fuel injector.
Figure 10A:
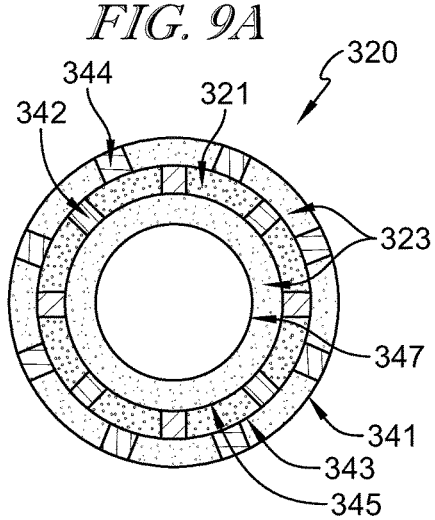
FIG. 10A is a diagrammatic sectional view taken along line 10A-10A in FIG. 10 suggesting that the stem is formed from a plurality of nested tubes having differing diameters to define an annular fuel passageway and annular cooling air passageways such that the heat exchanger is integral to the fuel injector and that pins extend between the tubes in the cooling air and fuel passageways which the fuel products and cooling air flow around.

Another embodiment of a fuel-air heat exchanger 320 for use in the fuel injector 17 is shown in FIGS. 9 and 9A. In the illustrative embodiment, the fuel-air heat exchanger 320 includes a plurality of nested tubes 341, 343, 345, 347 having various diameters to be spaced apart from one another. The tubes 341, 343 define an outer cooling air passageway 323 while the tubes 345, 347 define an inner cooling air passageway 323. The tubes 343, 345 define a fuel passageway 321. While four tubes are shown, more or less tubes may be used.

Figure 10:
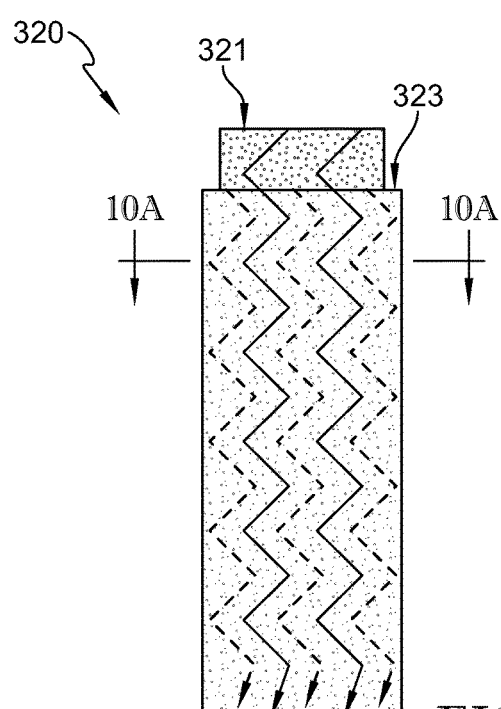
FIG. 10 is a view similar to FIG. 9 showing another embodiment of a flow arrangement through the stem where the air and fuel products flow radially through respective cooling air and fuel passageways.

In the illustrative embodiment, the air and fuel products flow radially along the cooling air passageways 323 and fuel passageway 321, respectively, as suggested in FIG. 9. In some embodiments, features are positioned between the tubes 341, 343, 345, 347 which alter the flow path of the air and fuel products to maximize the heat transfer area and heat transfer coefficient between the air and fuel products as suggested in FIG. 10. In one embodiment, pins 342, 344 are positioned in the fuel passageway 321 and outer cooling air passageway 323, respectively, which the air and fuel products flow around. In some embodiments pins are also positioned in the inner cooling air passageway 323.

Figure 12:
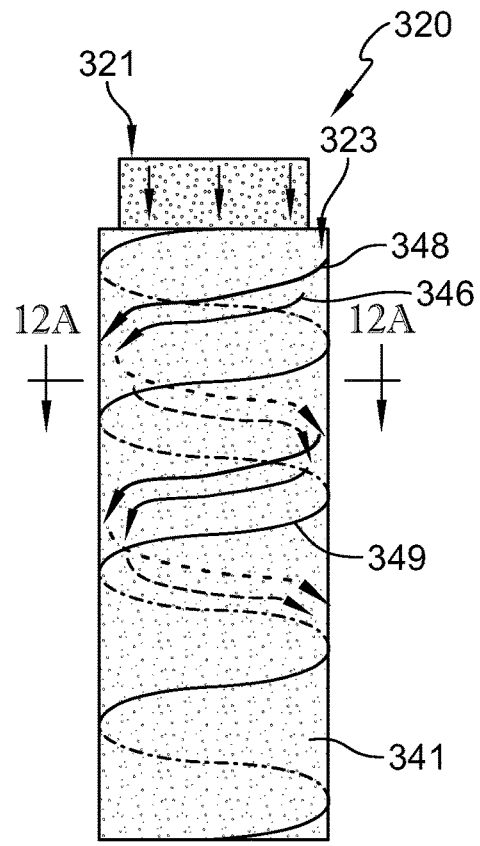
FIG. 12 is a view similar to FIG. 9 showing another embodiment of a flow arrangement through the stem where the air and fuel products flow along a helical path through the respective cooling air passageways and fuel passageway.
Figure 12A:
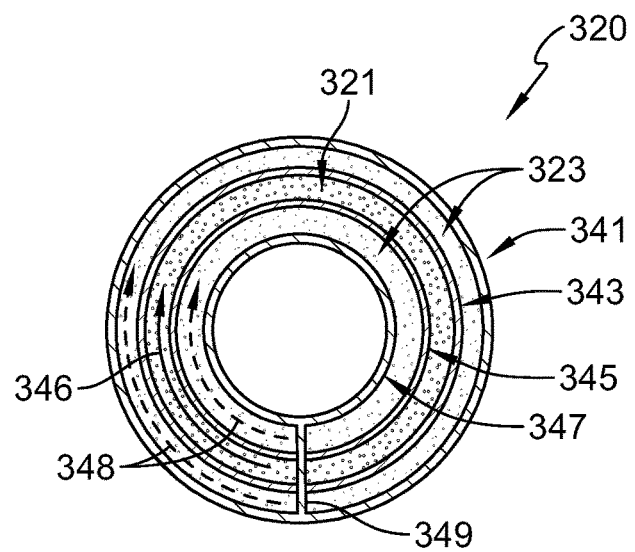
FIG. 12A is a diagrammatic sectional view taken along line 12A-12A in FIG. 12 suggesting that the stem is formed from a plurality of layers wrapped around a central tube to define a helical fuel passageway and helical cooling air passageways such that the heat exchanger is integral to the fuel injector.

In some embodiments, a plurality of layers 341, 343, 345 are helically wrapped around a central tube 347 to define a helical fuel passageway 321 and helical cooling air passageways 323 as suggested by arrows 346, 348, respectively, in FIGS. 12 and 12A. In the illustrative embodiment, the layers 341, 343, 345 are formed from sheets which are etched to define channels use to form the helical flow paths. The layers 341, 343, 345 are wrapped around the central tube 347 and bonded together. A weld seam 349 extends along abutting edges of the layers 341, 343, 345. In some embodiments, a plurality of nested tubes are used in place of the layers 341, 343, 345 which have etched internal surfaces to define channels used to form the helical flow paths. In some embodiments, separator walls are coupled between nested tubes along line 349 to define the helical flow paths.

Figure 11:
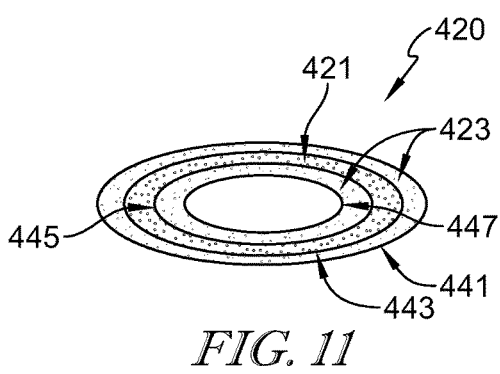
FIG. 11 is a view similar to FIG. 9A showing another embodiment of a fuel-air heat exchanger where the tubes forming the stem are oblong in cross-section to minimize drag resistance of air from the compressor flowing around the stem.

Another embodiment of a fuel-air heat exchanger 420 for use in the fuel injector 17 is shown in FIG. 11. The fuel-air heat exchanger 420 is similar to the fuel-air heat exchanger 320 shown in FIG. 9A with one difference being that tubes 441, 443, 445, 447 are formed with an oblong cross-section which may minimize drag resistance for air flowing around the fuel-air heat exchanger 420. In the illustrative embodiment, the tubes 441, 443, 445, 447 are nested into one another such that the tubes 441, 443, 445, 447 are spaced apart from one another. The tubes 441, 443 define an outer cooling air passageway 423 while the tubes 445, 447 define an inner cooling air passageway 423. The tubes 443, 445 define a fuel passageway 421. While four tubes are shown, more or less tubes may be used.

Figure 13:
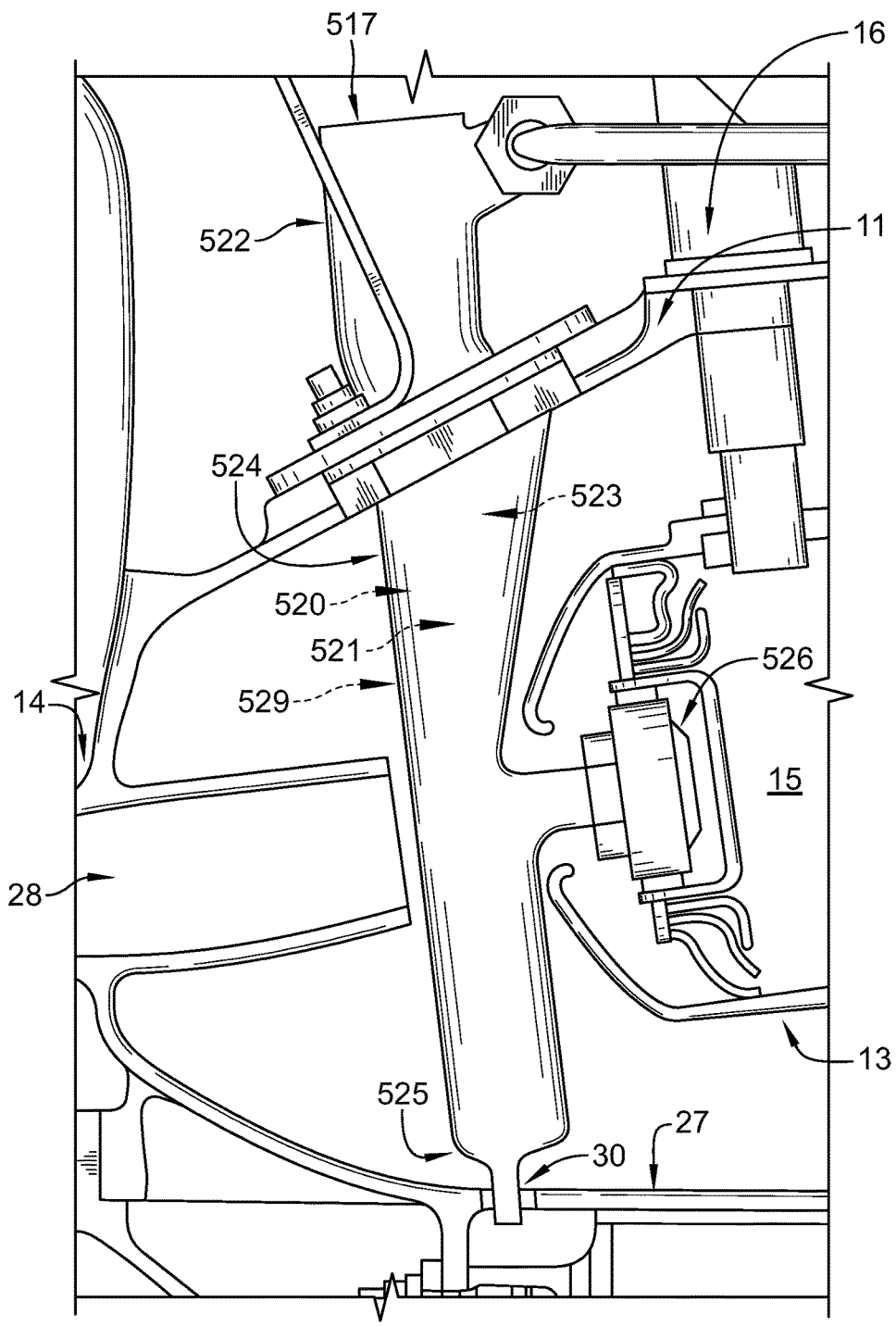
FIG. 13 is a view similar to FIG. 3 showing another embodiment of a fuel injector having a stem with elongated fuel and cooling air passageways formed in the stem to provide an integral heat exchanger.

Another embodiment of a fuel injector 517 is shown in FIG. 13. The fuel injector 517 is similar to fuel injector 17 of FIGS. 2-5 with one difference being that the fuel injector 517 includes elongated fuel and cooling air passageways 521, 523 which extend substantially from the outer combustor case 11 to the inner case 27. Each fuel injector 517 includes a connector 522, a stem 524 extending radially inward from the connector 522, and a fuel nozzle 526 coupled to the stem 524 as shown in FIG. 13. The connector 522 engages with the combustor case 11 to hold the fuel injector 517 in place and is configured to receive a flow of fuel product. The stem 524 and fuel nozzle 526 extend through the combustor case 11 to align the fuel nozzle 526 with the combustion chamber 15. In the illustrative embodiment, each of the fuel injectors 517 is separately replaceable from adjacent fuel injectors 517.

The stem 524 is formed to include a fuel-air heat exchanger 520 as suggested in FIG. 13. Fuel products enter through the connector 522, flow through a fuel passageway 521 of the stem 524 toward the fuel nozzle 526, and exit the fuel nozzle 526 into the combustion chamber 15 to be mixed and ignited with air from the compressor 14. An outlet 28 directs the compressed air exiting the compressor 14 around the fuel nozzle 526 and into the combustion chamber 15. In the illustrative embodiment, inlet ports 529 allow air in the high pressure plenum of the outer combustor case 11 to flow into a cooling air passageway 523 of the stem 524 to transfer heat to the fuel products in the fuel passageway 521 and form cooling air for use in the turbine 18 or other areas of the engine 10.

The fuel passageway 521 and cooling air passageway 523 are fluidly isolated from one another while allowing heat transfer between the fuel products and compressed air flowing therein as suggested in FIG. 13. The cooling air collects in a funnel 525 and is directed through an inner case 27 of the combustor 16. The funnel 525 extends through the inner case 27 and seals against a seal element 30. In some embodiments, the seal element 30 is a brush seal. The above descriptions for fuel injector 17 and fuel-air heat exchangers 20, 120, 220, 320, and 420 apply equally to fuel injector 517 and fuel-air heat exchanger 520.

Figure 14:
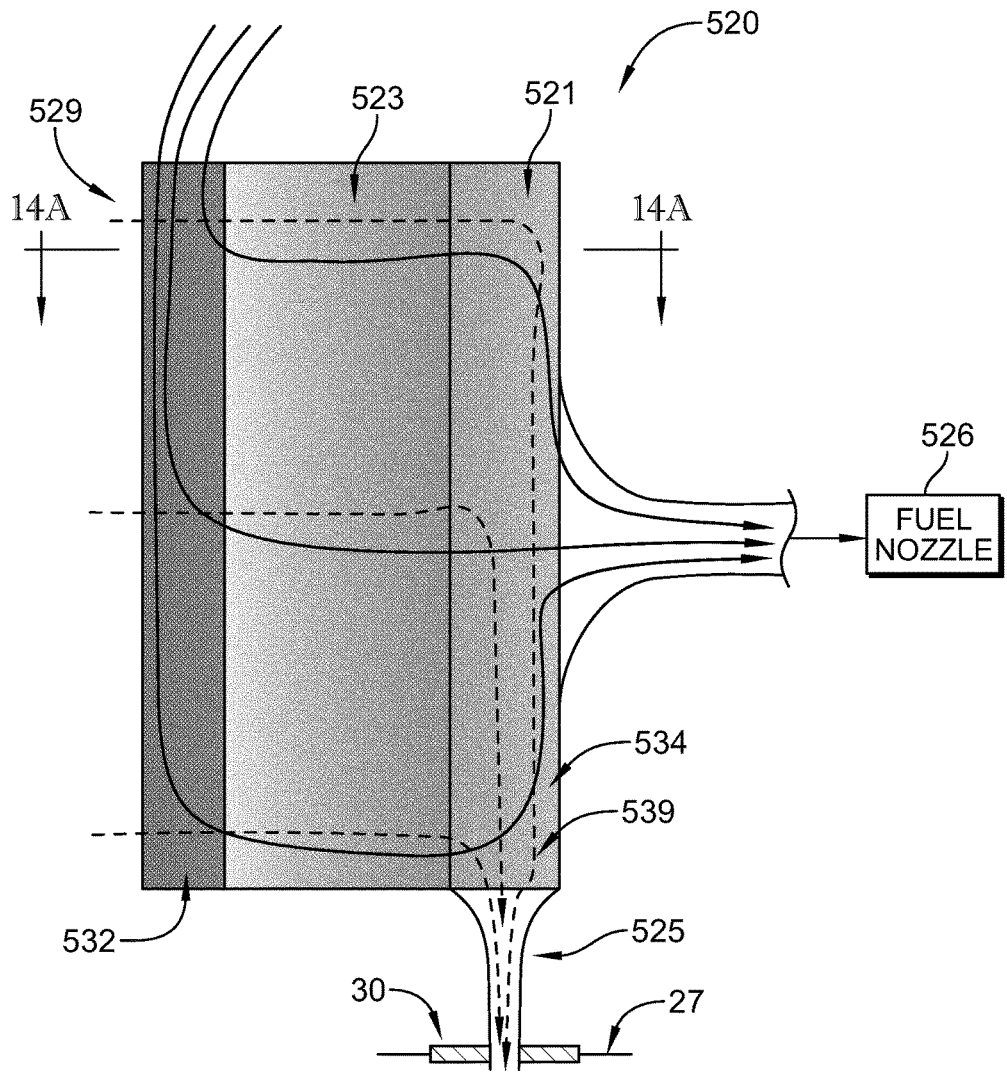
FIG. 14 is a diagrammatic side elevation of the stem of the fuel injector of FIG. 13 showing that cold fuel products enter through an entry plenum in a forward portion of the stem and hot air from the compressor enters the cooling air passageways through the forward end of the stem and suggesting that the air and fuel products flow axially aft while heat is transferred from the air to the fuel products.

In the illustrative embodiment, fuel products and compressed air flow through the fuel-air heat exchanger 520 in a common, axially aft and substantially parallel direction as suggested in FIG. 14. Cold fuel products flow into an entry plenum 532 formed in a forward portion of the stem 524 to radially distribute the fuel products along the stem 524. Separators 536 are radially distributed in the fuel passageway 521 to direct the fuel products axially aft from the entry plenum 532 to an exit plenum 534 as suggested in FIG. 14A.

Figure 14A:
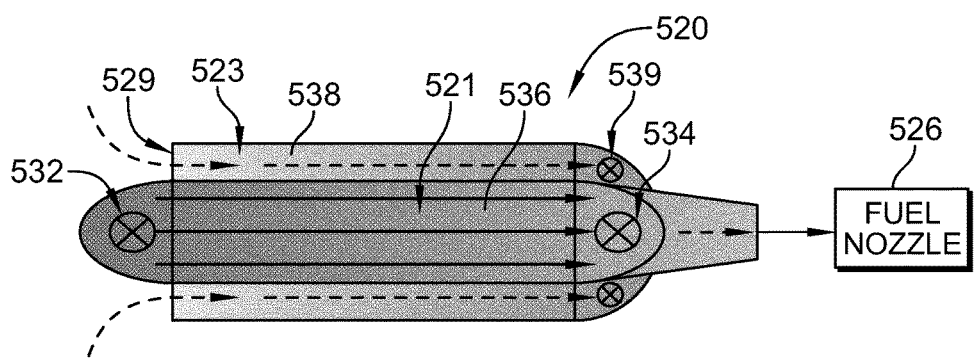
FIG. 14A is a diagrammatic sectional view taken along line 14A-14A in FIG. 14 showing that the fuel passageway extends axially from the entry plenum to an exit plenum and that the cooling air passageways extend along circumferential faces of the fuel passageway.

Hot air enters the cooling air passageways 523 through the inlet ports 529 as suggested in FIGS. 14 and 14A. The cooling air passageways 523 extend along circumferential end faces of the fuel passageway 521, though other orientations are contemplated by this disclosure. Separators 538 are radially distributed in the cooling air passageways 523 to direct the air axially aft from inlet ports 529 to an exit plenum 539. Heat is transferred from the air to the fuel products as the air and fuel products flow through the fuel-air heat exchanger 520, as suggested by the gradient transition from light to dark of the air and from dark to light of the fuel products, where dark is cool and light is hot. The cooled air exits through the funnel 525 while the heated fuel products are directed toward the fuel nozzle 526 as suggested in FIG. 14.

Figure 15:
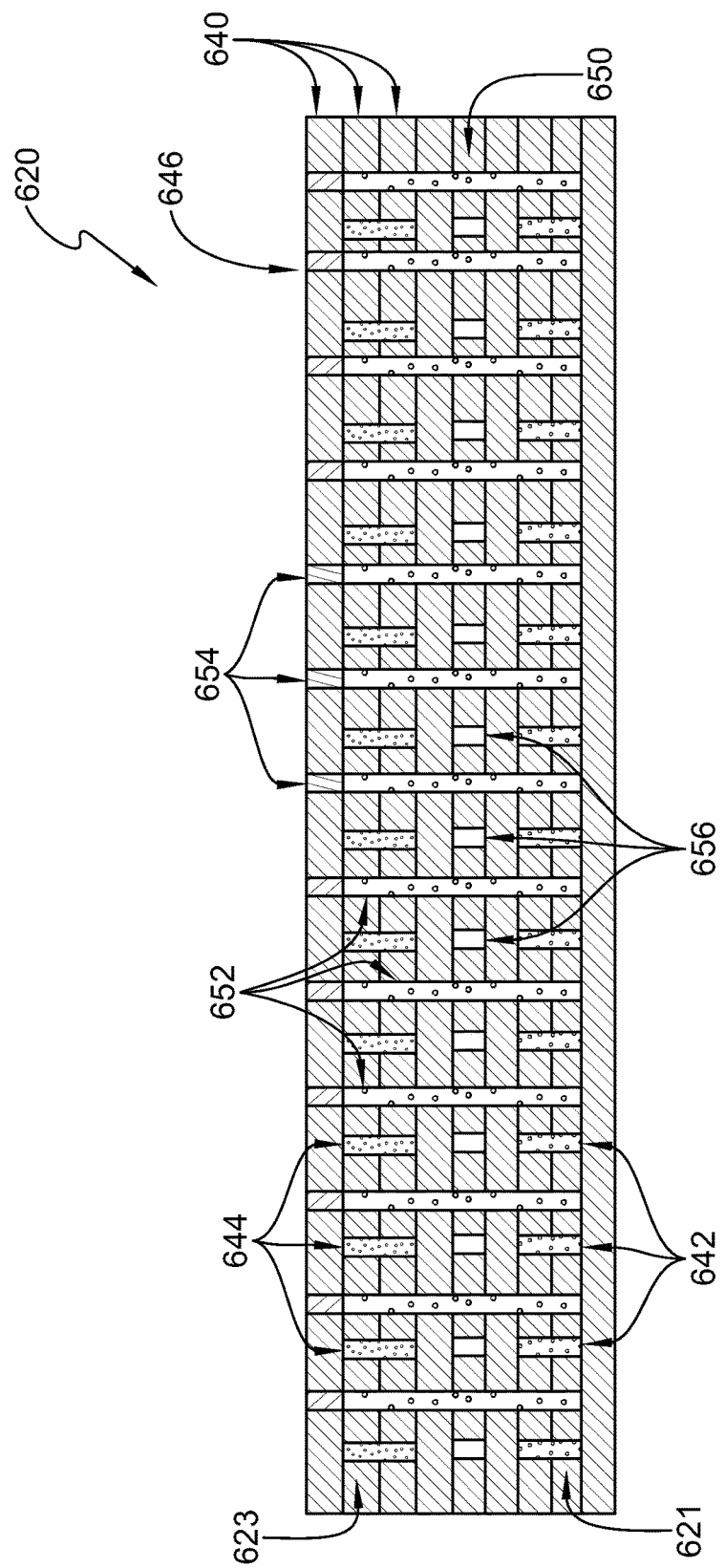
FIG. 15 is a view similar to FIG. 8 showing another embodiment of a fuel-air heat exchanger where the stem is formed from a plurality of plates which are etched and fused together to define radially extending channels of the fuel passageway, the cooling air passageway, and a heat pipe for transferring heat between the air and the fuel products.

Another embodiment of a fuel-air heat exchanger 620 for use in the fuel injector 17 or fuel injector 517 is shown in FIG. 15. In the illustrative embodiment, the fuel-air heat exchanger 620 includes a plurality of plates 640 which are etched and bonded together to define radially extending channels 642, 644, 652, 656. The channels 642 cooperate to define a fuel passageway 621. The channels 644 cooperate to define a cooling air passageway 623. The channels 652 cooperate to define a heat pipe assembly 650. In the illustrative embodiment, channels 652 are filled with a heat-exchange medium and closed with plugs 654. In some embodiments, the heat-exchange medium is sodium or potassium. Insulation channels 656 (or voids) are formed between opposing channels 642, 644 to minimize local heat transfer between the fuel products and air in order to minimize wetted wall temperatures. The insulation channels 656 may also be used for sensing fuel leaks or to enable purge paths. In some embodiments, the insulation channels 656, or additional insulation channels, may be used as a thermal barrier to minimize heat transfer from the air in the high pressure plenum of the outer combustor case 11 to the cooling air flowing in the funnel through the inner combustor case 27.

The heat pipe assembly 650 absorbs the heat from the air flowing through the cooling air passageway 623 and transfers the heat to the fuel products flowing through the fuel passageway 621 as suggested in FIG. 15. The heat pipe assembly 650 may maximize the total heat transfer capacity of the fuel-air heat exchanger 620 while minimizing the wetted wall temperature at the inlet of the cooling air passageway 623. In some embodiments, the plates 640 are formed from metallic materials and are diffusion bonded together to form a single printed-circuit block 646.

Another embodiment of a fuel-air heat exchanger 720 is shown in FIG. 16. The fuel-air heat exchanger 720 is similar to the fuel-air heat exchanger 520 of FIGS. 14 and 14A with one difference being that an aperture 760 is formed to allow at least a portion of cooled air to flow radially outward from the fuel-air heat exchanger 720. Fuel products flow through a fuel passageway 721 toward a fuel nozzle 726, and exit the fuel nozzle 726 into the combustion chamber 15 of the engine 10 to be mixed and ignited with air from the compressor 14. Inlet ports 729 allow air in the high pressure plenum of the outer combustor case 11 to flow into a cooling air passageway 723 to transfer heat to the fuel products in the fuel passageway 721 and form cooling air for use in the turbine 18 or other areas of the engine 10.

The fuel passageway 721 and cooling air passageway 723 are fluidly isolated from one another while allowing heat transfer between the fuel products and compressed air flowing therein as suggested in FIG. 16. At least a portion of the cooling air collects in a funnel 725 and is directed through an inner case 27 of the combustor 16 while another portion is directed outward through aperture 760. The funnel 725 extends through the inner case 27 and seals against a seal element 30. In some embodiments, the seal element 30 is a brush seal. The above descriptions for fuel injector 17 and fuel-air heat exchangers 20, 120, 220, 320, 420, and 520 apply equally to fuel-air heat exchanger 720.

In the illustrative embodiment, fuel products and compressed air flow through the fuel-air heat exchanger 520 in a common, axially aft and substantially parallel direction as suggested in FIG. 16. Cold fuel products flow into an entry plenum 732 formed in a forward portion to radially distribute the fuel products which are then directed axially aft from the entry plenum 732 to an exit plenum 734. Hot air enters the cooling air passageways 723 through the inlet ports 729.

The cooling air passageways 723 extend along circumferential end faces of the fuel passageway 721, though other orientations are contemplated by this disclosure. The air is directed axially aft from inlet ports 729 to an exit plenum 739. Heat is transferred from the air to the fuel products as the air and fuel products flow through the fuel-air heat exchanger 720, as suggested by the gradient transitions where dark is cool and light is hot. The cooled air exits through the funnel 725 and aperture 760 while the heated fuel products are directed toward the fuel nozzle 726.

Another embodiment of a fuel-air heat exchanger 820 is shown in FIG. 17. The fuel-air heat exchanger 820 is similar to the fuel-air heat exchanger 720 of FIG. 16 with one difference being that a divider wall 862 is positioned to direct at least a portion of cooled air toward an aperture 860 of the fuel-air heat exchanger 820. Fuel products flow through a fuel passageway 821 toward a fuel nozzle 826, and exit the fuel nozzle 826 into the combustion chamber 15 of the engine 10 to be mixed and ignited with air from the compressor 14. Inlet ports 829 allow air in the high pressure plenum of the outer combustor case 11 to flow into a cooling air passageway 823 to transfer heat to the fuel products in the fuel passageway 821 and form cooling air for use in the turbine 18 or other areas of the engine 10.

The fuel passageway 821 and cooling air passageway 823 are fluidly isolated from one another while allowing heat transfer between the fuel products and compressed air flowing therein as suggested in FIG. 17. At least a portion of the cooling air collects in a funnel 825 and is directed through an inner case 27 of the combustor 16 while another portion is directed outward through aperture 860 by the divider wall 862. In some embodiments, the outward directed flow and inward directed flow of cooling air can be at different temperatures upon exiting the cooling air passageway 823. The funnel 825 extends through the inner case 27 and seals against a seal element 30. In some embodiments, the seal element 30 is a brush seal. The above descriptions for fuel injector 17 and fuel-air heat exchangers 20, 120, 220, 320, 420, 520, and 720 apply equally to fuel-air heat exchanger 820.

In the illustrative embodiment, fuel products and compressed air flow through the fuel-air heat exchanger 820 in a common, axially aft and substantially parallel direction as suggested in FIG. 17. Cold fuel products flow into an entry plenum 832 formed in a forward portion to radially distribute the fuel products which are then directed axially aft from the entry plenum 832 to an exit plenum 834. Hot air enters the cooling air passageways 823 through the inlet ports 829. The cooling air passageways 823 extend along circumferential end faces of the fuel passageway 821, though other orientations are contemplated by this disclosure. The air is directed axially aft from inlet ports 829 to an exit plenum 839. Heat is transferred from the air to the fuel products as the air and fuel products flow through the fuel-air heat exchanger 820, as suggested by the gradient transitions where dark is cool and light is hot. The cooled air exits through the funnel 825 and aperture 860 while the heated fuel products are directed toward the fuel nozzle 826.

Another embodiment of a fuel-air heat exchanger 920 is shown in FIG. 18. The fuel-air heat exchanger 920 is similar to the fuel-air heat exchanger 820 of FIG. 17 with one difference being that the cooled air exits through an aperture 960 of the fuel-air heat exchanger 920. Fuel products flow through a fuel passageway 921 toward a fuel nozzle 926, and exit the fuel nozzle 926 into the combustion chamber 15 of the engine 10 to be mixed and ignited with air from the compressor 14. Inlet ports 929 allow air outside of the outer combustor case 11, such as interstage air, to flow into a cooling air passageway 923 to transfer heat to the fuel products in the fuel passageway 921 and form cooling air for use in the turbine 18 or other areas of the engine 10. In some embodiments, inlet port 929 could be coupled to other sources of cooling medium in order to cool other types of fluid. For example, a refrigerant or other suitable cooling fluid/gas could be passed through inlet port 929 to provide heat exchanger 920.

The fuel passageway 921 and cooling air passageway 923 are fluidly isolated from one another while allowing heat transfer between the fuel products and compressed air flowing therein as suggested in FIG. 18. The cooling air is directed through aperture 960. The above descriptions for fuel injector 17 and fuel-air heat exchangers 20, 120, 220, 320, 420, 520, 720, and 820 apply equally to fuel-air heat exchanger 920.

In the illustrative embodiment, fuel products and compressed air flow through the fuel-air heat exchanger 920 in a common, axially aft and substantially parallel direction as suggested in FIG. 18. Cold fuel products flow into an entry plenum 932 formed in a forward portion to radially distribute the fuel products which are then directed axially aft from the entry plenum 932 to an exit plenum 934. Hot air enters the cooling air passageways 923 through the inlet ports 929. The cooling air passageways 923 extend along circumferential end faces of the fuel passageway 921, though other orientations are contemplated by this disclosure. The air is directed axially aft from inlet ports 929 to an exit plenum 939. Heat is transferred from the air to the fuel products as the air and fuel products flow through the fuel-air heat exchanger 920, as suggested by the gradient transitions where dark is cool and light is hot. The cooled air exits through the aperture 960 while the heated fuel products are directed toward the fuel nozzle 926.

In illustrative embodiments, using fuel as a heat sink for providing a turbine 18 with Cooled Cooling Air (CCA) may be thermodynamically desired. However, using fuel as the heat sink will typically push the fuel beyond conventional temperature limits of fuel. To minimize the likelihood of unintended combustion, and to mitigate the consequences of a fire, a Fuel Cooled Air Cooler (FCAC) 20 may be positioned inside the engine's 10 core case 11 and integrated with the fuel injector 17. High temperature fuel and air is contained inside the engine's high pressure casing 11. The volume of high temperature fuel is reduced because hot fuel is only present in the fuel nozzle 26. This hot fuel is used immediately in the combustion chamber 15.

In illustrative embodiments, an overall weight of the CCA system is minimized due to reduced ducting and complexity. The FCAC 20 can be easily replaced with replacement of a single fuel injector 17. Providing CCA allows increased compressor 14 exit and turbine rotor 34 inlet temperatures and/or reduced amounts of cooling air needed for cooling such components providing an improvement in engine efficiency. The volume of high temperature fuel at any instant in time is reduced because the heat is added to the fuel just before it is burned. There is no need to transfer high temperature fuel over long distances or in low pressure zones outside of the high pressure core case of the engine.

In illustrative embodiments, by keeping the hot fuel and air inside the combustor case 11, the following risks may be reduced or avoided; leakage of this high-temperature, high-pressure air through external lines can damage components that are not designed to withstand such high temperatures; transferring heat to the fuel results in very high temperature fuel. If this fuel were to leak outside of the combustor case 11, it poses a significant fire risk due to auto-ignition; leakage of the compressor 14 exit air outside of the core 11 can lead to flow maldistribution issues in the secondary air system.

In illustrative embodiments, each individual fuel injector 17 includes an integrated heat exchanger 20. In FIGS. 4 and 5, the heat exchanger region where the hot air to be used for CCA is cooled and where the fuel picks up heat from the CCA stream is shown by a gradient transition from light to dark of the air and from dark to light of the fuel products, where dark is cool and light is hot. In some embodiments, a co-flow design is used to minimize the fuel wetted wall temperature. In some embodiments, a cross-flow or counter-flow is used.

In illustrative embodiments, a printed circuit heat exchanger (HX) 220 is used. The HX 220 may be built up from multiple layers of metal 240 that have been etched to provide flow passages 221, 223. These layers 240 may then be diffusion bonded. This process allows small/complex passages to be used for cooling air and fuel flow.

In illustrative embodiments, a printed circuit heat exchanger (HX) 620 is used. Etching the plates 640 may produce voids 656 in the metal that may increase thermal resistance to limit peak fuel/wall temperatures. The voids 656 may also be used for sensing fuel leaks or to enable purge paths. Channels 652 may be produced that are filled with a working fluid (e.g., sodium) to enhance heat transfer and at the same time manage wetted wall temperatures of the fuel. The top layer could have etched voids that when the assembly is bonded, the working fluid (e.g., solid sodium at room temperature) could be dropped in. Then the holes could be welded shut with plugs 654 in a vacuum chamber. The HX also maintains separation of the fuel and cooled cooling air.

In illustrative embodiments, to manage thermal stresses on the air side, one may choose to use fins that are interrupted in the air flow direction or for similar purpose, use a pin-fin arrangement. In some embodiments, fins (e.g. plain, offset strip, wavy, etc.) are included in the heat exchanger to maximize heat transfer between the air and fuel. In some embodiments, pin fins are used in the cooling air passageway which are bonded to the fuel/air interface plate of the heat exchanger. A thin wall shell may slide over this core (i.e., is not bonded to pins) to define the cooling air passageways. This arrangement may minimize thermal stresses in the heat exchanger.

In illustrative embodiments, a duct (sometimes called a funnel) transfers the CCA through the combustor inner case 27. A seal 30 may be used to block the CCA from flowing out of the combustor inner case region 27 and air in the high pressure plenum of the outer combustor case 11 from flowing into the inner case region 27. The seal 30 may allow for assembly misalignment and thermal growth misalignment. One possible type of seal 30 is a brush seal. In some embodiments, interstage compressor bleed air may be used to form the cooling air.

In illustrative embodiments, a heat exchanger 520 of a fuel injector 517 may provide an extended heat transfer surface. The heat exchanger 520 may extend from the outer 11 to inner combustor case 27 and maximize the heat transfer surface area. In some embodiments, coiled ducts are used.

In illustrative embodiments, the cooling function is distributed between multiple FCACs integrated into the fuel injectors 17. If a single FCAC needs to have the fuel flow shut down, it may have only a minor impact on the overall operation of the engine 10. In illustrative embodiments, the complexity and weight of the FCAC system may be reduced when compared with other possible CCA designs.

In illustrative embodiments, cooling air is drawn from the high pressure plenum within the outer combustor case 11 of the combustor 16 and does not exit the high pressure case 11 to be cooled.

In illustrative embodiments, the fuel-air heat exchanger is contained within the high pressure case 11 of the engine 10.

In illustrative embodiments, the HX is included inside the high pressure combustor case and is also formed as part of a line replaceable unit which can be exchanged during maintenance or repair of the engine 10.

In illustrative embodiments, the amount of air flowing through the heat exchanger 20, 120, 220, 320, 420, 520, 720, 820, 920 can be modulated. For example, during take-off speeds of the engine 10, sufficient fuel flow is maintained to cool the hot air without over heating the fuel. At a steady-state cruising or descent speed, the amount of fuel flow is reduced, and the heat capacity is also reduce. The amount of air flow can be increased or decreased to correspond with the heat capacity of the fuel based on speed of the engine 10, fuel flow, and/or maximum fuel temperature (as non-limiting examples). In some embodiments, a common inlet for high pressure air is used, such that the inlets of the heat exchangers are fluidly linked, and the air is distributed by lines to each fuel injector in the engine 10.

In illustrative embodiments, the air flow and fuel flow passageways can be in any number, arrangement, and orientation relative to one another to allow heat transfer between the fuel and air flowing therethrough.

In illustrative embodiments, divided portions of cooled air can leave the HX at the same or different temperatures.

In illustrative embodiments, other fluids can be cooled in the heat exchanger 20, 120, 220, 320, 420, 520, 720, 820, 920 such as inter-stage bleed air, or a refrigerant or other liquid as two non-limiting examples.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fuel injector for a gas turbine engine, the injector comprising:
   a nozzle configured to discharge fuel into a combustion chamber included in the gas turbine engine,
   a stem extending along a radially inward direction of the gas turbine engine, the stem coupled to the nozzle and configured to conduct fuel to the nozzle along the radially inward direction, and
   a fuel-air heat exchanger integral with the stem, the fuel-air heat exchanger including:
      a fuel passageway coupled fluidly with the nozzle,
      a cooling air passageway defining a funnel having a plurality of air channels located along the fuel passageway to direct air flowing through the plurality of air channels along the radially inward direction and parallel to the fuel flowing through the fuel passageway such that heat is transferred from the air flowing through the plurality of air channels to the fuel flowing through the fuel passageway when the fuel injector is used in the gas turbine engine to form cooled air that is collected in the funnel, and
      an inlet port positioned along a wall of the stem to allow air into the cooling air passageway, wherein the fuel injector is configured to direct the cooled air in the funnel away from the combustion chamber to cool a turbine of the gas turbine engine.

2. The fuel injector of claim 1, wherein the fuel-air heat exchanger includes at least one of an insert arranged in the fuel passageway and an insert arranged in the cooling air passageway.

3. The fuel injector of claim 2, wherein the insert arranged in the fuel passageway is corrugated and/or the insert arranged in the cooling air passageway is corrugated.

4. The fuel injector of claim 1, wherein the fuel-air heat exchanger includes a plurality of pins positioned in the cooling air passageway such that air moving through the cooling air passageway flows over the plurality of pins.

5. The fuel injector of claim 1, wherein the fuel-air heat exchanger includes a plurality of plates that are etched and bonded together to form the fuel passageway and the cooling air passageway.

6. The fuel injector of claim 1, wherein the fuel-air heat exchanger includes a plurality of nested tubes having different diameters that cooperate to define the fuel passageway and the cooling air passageway.

7. The fuel injector of claim 6, wherein each of the plurality of nested tubes has an oblong cross sectional shape.

8. The fuel injector of claim 1, wherein the fuel-air heat exchanger includes a sheet formed to define at least one channel and a tube, wherein the sheet is helically wrapped around the tube to close the channel and define a helical flow path.

9. The fuel injector of claim 1, wherein the fuel-air heat exchanger includes channels arranged between the fuel passageway and the cooling air passageway filled with a heat-exchange medium to form a heat pipe assembly between fuel in the fuel passage and air in the cooling air passage when the fuel injector is in use.

10. A combustor assembly for use in a gas turbine engine, the combustor assembly comprising:
   a combustor case,
   a combustion liner mounted in the combustor case to define a combustion chamber, and
   a plurality of fuel injectors adapted to conduct fuel from a supply line arranged outside the combustor case into the combustor case and to discharge fuel into the combustion chamber, each fuel injector of the plurality of fuel injectors including:
      a nozzle configured to discharge fuel into the combustion chamber,
      a stem extending along a radially inward direction of the gas turbine engine, the stem coupled to the nozzle and configured to conduct fuel to the nozzle along the radial direction, and
      a fuel-air heat exchanger integral with the stem and arranged inside the combustor case, the fuel-air heat exchanger including:
         a fuel passageway coupled fluidly with the nozzle,
         a cooling air passageway defining a funnel having a plurality of air channels located along the fuel passageway to direct air flowing through the plurality of air channels along the radially inward direction and parallel to the fuel flowing through the fuel passageway such that heat is transferred from the air flowing through the plurality of air channels to the fuel flowing through the fuel passageway when the fuel injector is used in the gas turbine engine to form cooled air that is collected in the funnel, and
         an inlet port positioned along a wall of the stem to allow air into the cooling air passageway,
      wherein the fuel injector is configured to direct the cooled air in the funnel away from the combustion chamber to cool a turbine of the gas turbine engine.

11. The combustor assembly of claim 10, wherein each fuel injector includes a connector coupled to the combustor case and the stem extends from the connector to the nozzle.

12. The combustor assembly of claim 10, wherein each fuel injector is circumferentially spaced apart from other fuel injectors.

13. The combustor assembly of claim 10, wherein an inlet of the cooling air passageway included in each fuel injector is fluidly separate from inlets of the cooling air passageways include in other fuel injectors.

14. The combustor assembly of claim 10, wherein an inlet of the cooling air passageway included in each fuel injector is fluidly linked with inlets of the cooling air passageways include in other fuel injectors.

15. The combustor assembly of claim 10, wherein the fuel-air heat exchanger includes at least one of a corrugated insert comprising metallic materials arranged in the fuel passageway and a corrugated insert comprising metallic materials arranged in the cooling air passageway.

16. The combustor assembly of claim 10, wherein the fuel-air heat exchanger includes a plurality of plates that are etched and bonded together to form the fuel passageway and the cooling air passageway.

17. The combustor assembly of claim 16, wherein the plurality of plates are etched and bonded together to form channels arranged between the fuel passageway and the cooling air passageway filled with a heat-exchange medium to form a heat pipe assembly between fuel in the fuel passage and air in the cooling air passage when the fuel injector is in use.

18. The combustor assembly of claim 10, wherein the fuel-air heat exchanger includes a sheet formed to define at least one channel and a tube, wherein the sheet is helically wrapped around the tube to close the channel and define a helical flow path.

19. The combustor assembly of claim 10, wherein an amount of air distributed to the fuel-air heat exchanger of each fuel injector is modulated based on at least one of speed of the engine, fuel flow, and maximum fuel temperature.

20. The combustor assembly of claim 10, wherein an inlet of the cooling air passageway is configured to receive air from outside of the combustor case.

21. A gas turbine engine comprising
   a turbine assembly including a cooling air cavity and a cooled turbine blade, and
   a combustor including a combustor case, a combustion liner mounted in the combustor case to define a combustion chamber, and a plurality of fuel injectors adapted to conduct fuel from a supply line arranged outside the combustor case into the combustor case and to discharge fuel into the combustion chamber,
   wherein each fuel injector of the plurality of fuel injectors includes:
      a nozzle configured to discharge fuel into the combustion chamber,
      a stem extending along a radially inward direction of the gas turbine engine, the stem coupled to the nozzle and configured to conduct fuel to the nozzle, and
      a fuel-air heat exchanger integral with the stem and arranged inside the combustor case, the fuel-air heat exchanger including:

a fuel passageway coupled fluidly with the nozzle,
a cooling air passageway defining a funnel having a plurality of air channels located along the fuel passageway to direct air flowing through the plurality of air channels along the radially inward direction and parallel to the fuel flowing through the fuel passageway such that heat is transferred from the air flowing through the plurality of air channels to the fuel flowing through the fuel passageway when the fuel injector is used in the gas turbine engine to form cooled air that is collected in the funnel, and
an inlet port positioned along a wall of the stem to allow air into the cooling air passageway,
wherein the fuel injector is configured to direct the cooled air in the funnel away from the combustion chamber and toward the cooling air cavity to provide the cooled air to the cooled turbine blade of the turbine assembly.

22. The gas turbine engine of claim 21, wherein the cooling air passageway is coupled for fluid communication with the cooling air cavity of the turbine assembly.

23. The gas turbine engine of claim 21, wherein the cooling air passageway is configured to conduct the cooled air to a location radially inward of the combustion liner included in the combustor.

24. The gas turbine engine of claim 23, wherein the cooling air passageway is configured to conduct the cooled air through an inner combustor case included in the combustor and further comprising a seal member to block air from passing around the cooling air passageway and through the inner case.

25. The gas turbine engine of claim 24, wherein the seal member is formed to allow misalignment of the fuel injector with the inner case and still block the flow of air around the cooling air passageway.

26. The gas turbine engine of claim 21, wherein the cooling air passageway is configured to conduct the cooled air to a location radially outward of the combustion liner included in the combustor.

27. The gas turbine engine of claim 26, wherein the cooling air passageway is configured to conduct the cooled air to a location radially inward of the combustion liner included in the combustor.

28. The gas turbine engine of claim 27, wherein the cooled air conducted radially outward is at a first temperature, wherein the cooled air conducted radially inward is at a second temperature, and wherein the first temperature is different than the second temperature.

* * * * *